United States Patent [19]

Bradley

[11] Patent Number: 4,838,070

[45] Date of Patent: Jun. 13, 1989

[54] METHOD AND APPARATUS FOR DRY TESTING WATER-IMMERSIBLE ACOUSTIC TRANSDUCERS

[75] Inventor: Liam P. Bradley, Dunfermline, Scotland

[73] Assignee: Marconi Instruments Limited, England

[21] Appl. No.: 71,321

[22] Filed: Jul. 9, 1987

[30] Foreign Application Priority Data

Jul. 11, 1986 [GB] United Kingdom ............... 8616924

[51] Int. Cl.⁴ .................... H01L 41/22; G01L 25/00; H04B 17/00; H04R 29/00

[52] U.S. Cl. .................................. 73/1 DV; 73/1 R; 73/661; 73/865.6; 310/334; 310/321; 310/336; 310/337; 367/13; 367/152; 367/157

[58] Field of Search ................ 324/56, 209; 310/338, 310/334, 321, 336, 337; 73/517 AV, DIG. 4, 1 R, 1 DV, 866.4, 661, 865.6; 367/13, 152, 157, 159

[56] References Cited

U.S. PATENT DOCUMENTS

| | | | |
|---|---|---|---|
| 2,572,667 | 10/1951 | Ruggles | 324/56 |
| 4,099,407 | 7/1978 | Louit | 324/56 X |
| 4,331,021 | 5/1982 | Lopez et al. | 73/1 DV |
| 4,430,883 | 2/1984 | Aupan | 73/1 DV |
| 4,668,909 | 5/1987 | Hickernell et al. | 324/56 |

FOREIGN PATENT DOCUMENTS

| | | | |
|---|---|---|---|
| 1187078 | 10/1985 | U.S.S.R. | 324/56 |
| 1205073 | 1/1986 | U.S.S.R. | 324/56 |
| 1242859 | 7/1986 | U.S.S.R. | 324/56 |
| 2019566 | 10/1979 | United Kingdom | 73/1 DV |

OTHER PUBLICATIONS

"Ultrasound Phantoms", *ATS Laboratories*, Catalog #10515, 9-7-81, pp. 1–4.

*Primary Examiner*—Reinhard J. Eisenzopf
*Assistant Examiner*—Warren S. Edmonds
*Attorney, Agent, or Firm*—Kirschstein, Ottinger, Israel & Schiffmiller

[57] ABSTRACT

A method of testing piezo-electric transducers includes locating one end (11) of a rod (10) of solid material over the active head (20) of the transducer, the rod (10) simulating the normal acoustic impedance presented to the transducer by the normal medium, in which the transducer is intended to operate, energizing the transducer and detecting the acoustic wave propagated through the rod at the other end of the rod. A loading rod for use in testing a piezo-electric transducer is an elongated solid body so dimensioned as to simulate the normal operating acoustic impedance presented to a piezo-electric transducer to be tested.

15 Claims, 2 Drawing Sheets

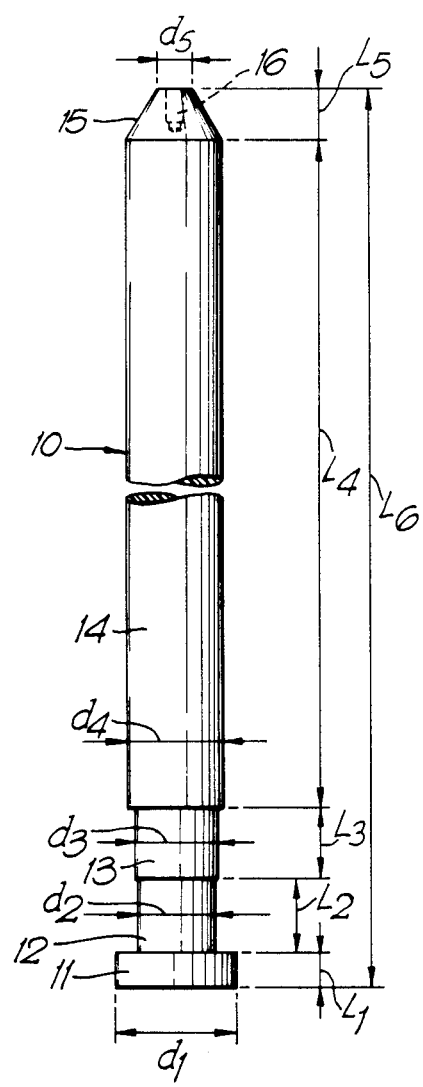
Fig. 1.
Fig. 2.
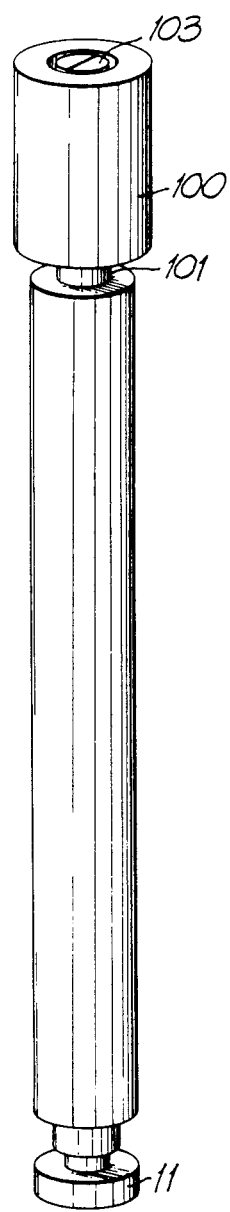
Fig. 3.

METHOD AND APPARATUS FOR DRY TESTING WATER-IMMERSIBLE ACOUSTIC TRANSDUCERS

BACKGROUND OF THE INVENTION

1. Field of the Invention

The present invention concerns a method of, and apparatus for, testing one or an array of more than one piezo-electric or equivalent type transducers.

2. Description of Related Art

One application involving the use of piezo-electric transducers is in generating or detecting acoustic signals underwater, for example in an assembly such as a phased array.

In order to test such transducers it is necessary to simulate the normal acoustic impedance presented to them in the medium in which they are intended to operate. This presents problems when the operating medium is a fluid such as water.

SUMMARY OF THE INVENTION

The present invention has for an object to provide a method of, and apparatus for, testing piezo-electric transducers intended for operation in a liquid medium, which would normally be water, without the need for immersing the transducers in the liquid medium.

Accordingly from one aspect the present invention consists in a method of testing piezo-electric transducers comprising locating one end of a rod of solid material over the active head of the transducer, the rod simulating the normal acoustic impedance presented to the transducer by the normal medium, in which the transducer is intended to operate, energizing the transducer and detecting the acoustic wave propagated through the rod by means located at the other end of the rod.

Preferably a plurality of piezo-electric transducers forming a phased array are tested in this manner simultaneously. In such a situation the signal from one of the rods can be used as an amplitude and phase reference point and the results from the other piezo-electric transducers used to characterize the array.

From a second aspect the invention consists in a loading rod for use in testing a piezo-electric transducer, the rod comprising an elongated solid body so dimensioned as to simulate the normal operating acoustic impedance presented to a piezo-electric transducer to be tested.

From a third aspect the invention consists in test apparatus comprising a plurality of loading rods as defined hereinbefore, the rods being mounted in a mounting member so that one end of each rod can be placed in contact with an individual piezo-electric transducer.

Preferably means are provided whereby the contact force between a rod and its associated piezo-electric transducer can, in operation of the apparatus, be varied. Such means may comprise a pressure chamber into which the ends of the rods remote from the piezo-electric transducers extend. The rods may themselves be slidable in sleeves held within the mounting member.

BRIEF DESCRIPTION OF THE DRAWINGS

In order that the invention may be more readily understood, embodiments thereof will now be described by way of example, and with reference to the accompanying drawings, in which:

FIG. 1 is a side view of a loading rod according to the present invention,

FIG. 2 is an end view of the rod of FIG. 1,

FIG. 3 is a perspective view of a second embodiment of a rod according to the present invention.

DETAILED DESCRIPTION OF THE PREFERRED EMBODIMENTS

Figure 4:
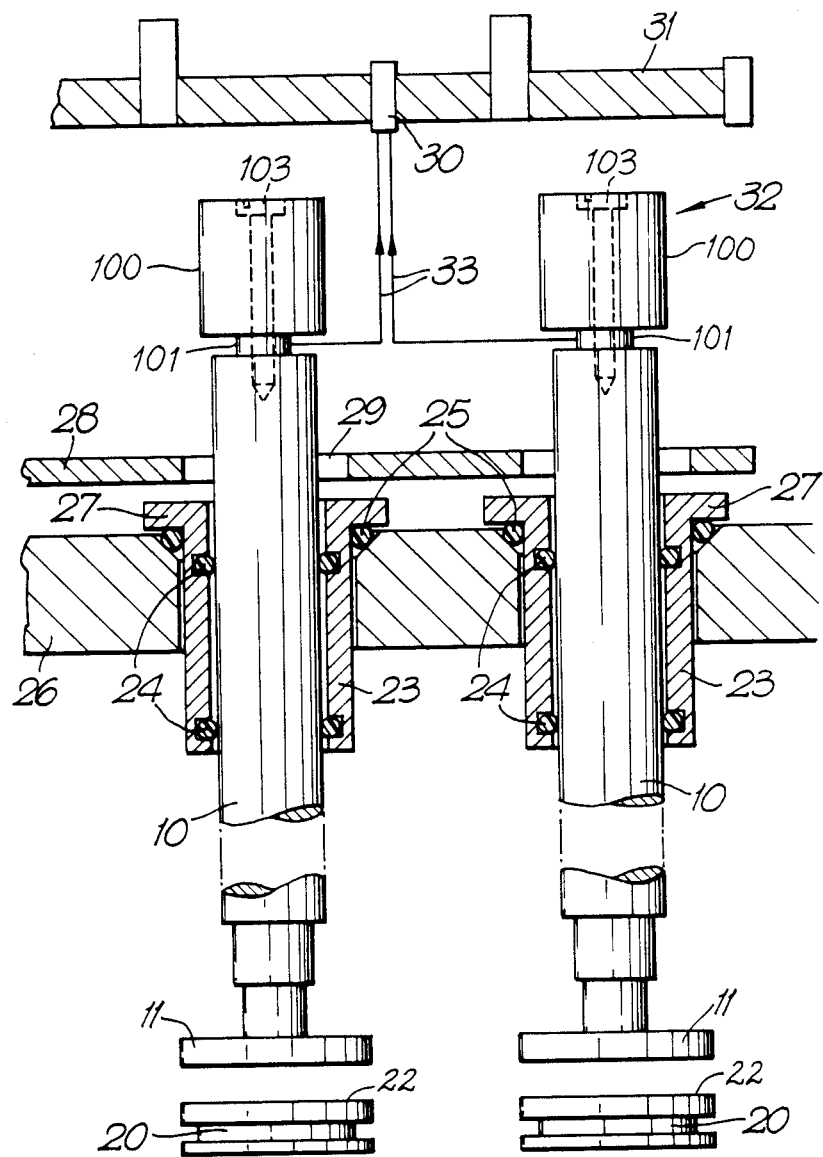
FIG. 4 is a side view of a testing apparatus involving a plurality of rods which are identical to the rod shown in FIG. 3.

Referring now to the accompanying drawings, FIG. 1 shows a rod-like member 10 made from a rigid, low-loss material such as an acrylic polymer, Alternatively the rod may be made from acoustic absorbent material to facilitate attenuating the signal while it travels along the rod. In this way the design permits the use of the rod in continuous wave applications. A further refinement is possible if the low-loss acrylic polymer is surrounded (or clad) in acoustic absorbent material. In this way the attenuation characteristics of the rod can be adjusted to suit a particular application. In this context low-loss is used in an acoustical context. The purpose of the rod is to present a mechanical impedance to a piezo-electric transducer which corresponds to the complex load, normally referred to as $Z_L$, which the transducer sees when normally immersed in water. The load represented by the rod is equivalent to a mass in series with a radiation resistance both of which vary with frequency. The test transducer end of the rod 10 is, in use, placed in actual contact with the emitting head of the transducer being tested, the contact being improved by the use of a couplant in the form of a film of suitably viscous fluid to exclude air bubbles. This end is shown at 11 in FIG. 1. As can be seen from FIG. 1 the total length of the rod is given as $L_6$ and the diameter of the test transducer end as $d_1$.

The test transducer end 11 has a thickness $L_1$ and the next portion 12 of rod 10 is of reduced diameter $d_2 < d_1$ and of length $L_2$. This is followed by another stepped portion 13 of length $L_3$ and diameter $d_3$ slightly greater than $d_2$ but less than $d_1$. The relationship between the various diameters will be discussed later. After this the main portion 14 of the rod 10 is of a diameter $d_4$ only slightly less than $d_1$.

Finally the main portion 14 terminates in a section 15 which is frusto-conical in cross-section. This section 15 terminates in a mounting diameter $d_5$ and carries an accelerometer (not shown but normally mounted in the hole 16 shown) and is thus known as the accelerometer end of the rod. It will be appreciated that the dimensions of rod 10 will depend on a number of variables such as the nature of the transducer to be tested and the material from which the rod is made.

The changes of the rod diameter when moving away from the test transducer end 11 are thus chosen to achieve the required impedance transitions calculated in a manner equivalent to the techniques used in Electrical Transmission Line Theory. Thus the design methodology used in determining the rod dimensions is the mechanical equivalent of the electrical theory.

The criteria used for matching the rod dimensions to a transducer are as follows:

Diameter $d_1$ is chosen to suit the transducer to be loaded and thus matches the diameter of the emitting head of the transducer.

$Z_L$ the primary load is given by a unique solution to the load design equation containing the parameters $L_1$ and $d_2$.

The length $L_2$ influences the effect of the impedance match at frequencies other than the selected frequency and is chosen for optimum performance over the frequency band of interest.

$d_3$ is a transition diameter while the length $L_3$ is determined by $Z_L$. $L_3$ is designed to be a quarter wavelength long for the given rod acoustic velocity. In this embodiment $d_3$ is the geometric mean between diameters $d_2$ and $d_4$. The reason for this is as follows. In Electrical Transmission Line Theory it is known that two dissimilar impedances can be matched by using the geometric mean of the two impedances. When dealing with acoustic phenomena the acoustic impedance of a circular-cross-section transmitting medium is proportional to its diameter. The electrical theory thus reduces to the geometric mean of diameters in its acoustic equivalent. In the embodiment being described $d_4$ is a preset diameter stemming from the fact that only certain diameters of rod are available. It is thus possible to avoid having the additional stepped portion 13 should rod-like material of the correct diameter for a particular response be available.

When the apparatus is being used in pulse mode the length $L_4$ is determined by the time dependent measurement window where the time factor is the transit time for the acoustic wavefront to enter the rod 10 and make one complete return journey. This ensures that the radiation impedance remains constant for the duration of the measurement.

With regard to the accelerometer end of the rod the transition from the main diameter $d_4$ to the mounting diameter $d_5$ is chosen for sensitivity reasons. The taper is chosen to give the best ratio of axial to peak displacement in the standing wave near the accelerometer end. The accelerometer itself provides the mechanism for converting the acoustic wave within rod 10 into an electrical signal for use in any nominated measurement system. The ability of the accelerometer to act as an acoustic wave transmitter enables the loading rod 10 to stimulate a test transducer in its receiving mode.

An alternative embodiment of the basic rod is shown in FIG. 3. As can be seen the test end 11 of this second embodiment is similar, but more sharply stepped than the end of the rod shown in FIG. 1. At the upper end of the rod the rod is provided with a tail mass 100 which is separated from the main body of the rod by an accelerometer 101. The tail mass is secured to the main body by a retaining bolt 103. This arrangement provides greater sensitivity with regard to that shown in FIG. 1.

Referring now to FIG. 4 of the drawings this shows a test rig having two loading rods 10 similar to FIG. 3. The rig may have more than two loading rods. As the mounting arrangement for the two loading rods are identical, only one will be described in detail. Thus in the rig a rod 10 is mounted above a piezo-electric transducer 20. The transducer 20 is entirely conventional and includes a piezo-electric crystal and a metal head 22, known as the transmitting head via which an acoustic wave is transmitted or through which an acoustic wave can be received. As can be seen the diameter of the transducer end 11 of the rod 10 is the same as that of the head 22 of the transducer. The rod 10 is held in a sleeve 23 and is capable of sliding within the sleeve. Two "O" rings 24 seal the rod within sleeve 23 and a further "O" ring 25 seals the sleeve 23 with respect to a cross-member 26. The sleeve 23 has a flange 27. A plate 28 having holes 29 through which the rods 10 extend is, during use of the rig, bolted to the cross-member 26 to hold the flange 27 immobile. An electrical lead 33 extends from the accelerometer 101 via a gland 30 to appropriate measuring equipment. The gland 30 is mounted in the roof 31 of a pressure chamber generally indicated at 32 and is a multiway connector which can withstand the operating pressure of the chamber. Suitable means (not shown) are provided for pressurizing this chamber 32. Thus a gas under pressure can be controllably pumped into the chamber. This means that the force applied to rod 10 can be varied so as to simulate changes in depth. It will be appreciated that during use of the test rig the rod 10 will be in actual contact with the head of the transducer under test. The use of gas to increase pressure during testing may be combined with the application of a vacuum or partial vacuum after testing to assist in lifting off the rods from the array.

In an alternative embodiment the pressure chamber is omitted. Varying forces can be applied to the load rod 10 in a mechanical or electrical manner. Thus each rod might be attached to a rack and pinion device, to a hydraulic device or to a solenoid-type device.

The transducers under test may form part of a phased array, and in this case one or more of the transducers may act as a receiver as well as a transmitter. The test rig just described enables tests of this nature to be carried out as well by using one or more of the accelerometers. The test rig just described has a number of principal features. In particular every transducer can be loaded for test purposes with a water equivalent load removing the requirement for immersion.

Secondly each rod can be used in two modes so as to either receive an acoustic signal from a transducer under test or to transmit such a signal to the transducer.

Thirdly the force applied to a rod can be varied to simulate changes in depth.

Fourthly when a plurality of rods are arranged in a multiple test rig each rod can have a termination capable of measuring the phase and amplitude difference of the signal propagated through the rod with respect to a reference point. The reference point can be a selected signal derived from any chosen transducer under test. As described previously the bidirectional capability of the rods can be used to transmit a signal to the transducer. When a number of rods are arranged in a multiple test rig each rod can be stimulated in both phase and amplitude with respect to a reference point. The reference point can be a selected accelerometer driving signal.

The combination of driving signals can be arranged to provide the ability to stimulate the array with a simulation of an incident acoustic wavefront.

A further capability exists to replace the accelerometers with suitable transducers designed to match the acoustic impedance of the rod as measured at diameter $d_4$ of FIG. 1.

It will also be appreciated that each signal emanating from a test transducer is constrained to travel along its own loading rod and is therefore prevented from acoustically coupling with equivalent signals simultaneously generated by other test transducers.

The test rig accordingly has the capability of correctly loading an array of piezo-electric transducers with a completely dry radiation impedance equivalent to its normal free space impedance (i.e. water). It can measure the performance of the array of transducers as a whole by acquiring phase and amplitude information from each transducer. Furthermore the performance of the transducers can be measured in both the transmitting and receiving modes of operation. Finally, these measurements can be performed in a manner which simulates varying depth conditions.

While the preceding description has been directed to piezo-electric transducers, it will be appreciated that the invention can be applied to any type of transducer in which an acoustic wave is transmitted through a solid body for subsequent transmission through a medium of interest. An example of another type of transducer is the magnetostrictive transducer.

I claim:

1. A method of dry testing an acoustic transducer of the type operative, when immersed in a liquid which presents an acoustic impedance characteristic to an active head of the acoustic transducer, for processing acoustic signals, comprising the steps of:
   (a) simulating said acoustic impedance characteristic by a solid material, elongated, acoustic coupling rod operative for propagating the acoustic signals between a test end region of the rod and a detector end region of the rod;
   (b) acoustically coupling the test end region of the rod to the active head of the transducer;
   (c) acoustically coupling the detector end region of the rod to an acoustic detector;
   (d) energizing the acoustic transducer for propagating an acoustic signal along the rod from the test end region to the detector end region; and
   (e) detecting the propagated acoustic signal by the acoustic detector.

2. The method as recited in claim 1, wherein the simulating step is performed by simulating the acoustic impedance characteristic presented by the liquid to a piezoelectric transducer of the water-immersible type.

3. The method as recited in claim 1, wherein the simulating step is performed by simulating the acoustic impedance characteristic presented by the liquid to a plurality of piezo-electric transducers of the water-immersible type, each transducer having a respective solid material, acoustic coupling rod; and wherein the energizing step is performed by simultaneously energizing all the transducers; and wherein the detecting step is performed by detecting an acoustic signal propagated from one of the transducers and using said acoustic signal as a reference signal.

4. The method as recited in claim 1, wherein step (b) is performed by contacting the active head of the transducer with the test end region of the rod with a contact pressure, and by adjustably varying the contact pressure.

5. The method as recited in claim 1, wherein the simulating step is performed by configuring the rod with a plurality of stepped, cylindrical sections of predetermined lengths and diameters.

6. An acoustic coupling rod for use in dry testing an acoustic transducer of the type operative, when immersed in a liquid which presents an acoustic impedance characteristic to the transducer, for processing acoustic signals, said rod comprising:
   an elongated body of solid material having a plurality of stepped sections of predetermined lengths and sizes configured for simulating said acoustic impedance characteristic,
   one of the body sections being a test end region for coupling to the transducer, and
   another of the body sections being a detector end region for coupling to an acoustic detector.

7. The rod as recited in claim 6, wherein said detector end region has a frusto-conical shape.

8. The rod as recited in claim 6, wherein the body includes a main cylindrical region intermediate the end regions.

9. The rod as recited in claim 6, wherein the acoustic detector is an accelerometer transducer acoustically coupled to the detector end region; and further comprising a tail mass secured to the accelerometer transducer.

10. The rod as recited in claim 6, wherein the body is constituted of a rigid, acoustically low-loss material.

11. A test arrangement for dry testing an acoustic transducer of the type operative, when immersed in a liquid which presents an acoustic impedance characteristic to an active head of the acoustic transducer, for processing acoustic signals, said arrangement comprising:
   (a) a liquid simulator means including a solid material, elongated, acoustic coupling rod configured to simulate said acoustic impedance characteristic;
   (b) said rod having a test end region acoustically coupled to the active head of the transducer;
   (c) said rod also having a detector end region remote from the test end region;
   (d) means for energizing the acoustic transducer for propagating an acoustic signal along the rod from the test end region to the detector end region; and
   (e) detector means acoustically coupled to the detector end region, and operative for detecting the propagated acoustic signal.

12. The arrangement as recited in claim 11, wherein the acoustic transducer is a piezo-electric transducer of the water-immersible type.

13. The arrangement as recited in claim 12; and further comprising additional piezo-electric transducers of the water-immersible type, each transducer having a respective solid material, acoustic coupling rod; and wherein the energizing means is operative for simultaneously energizing all the transducers; and wherein the detector means is operative for detecting an acoustic signal propagated from one of the transducers and using said acoustic signal as a reference signal.

14. The arrangement as recited in claim 11, wherein said test end region contacts the active transducer head with a contact pressure; and further comprising means for adjustably varying the contact pressure.

15. The arrangement as recited in claim 14; and further comprising a support sleeve in which the rod is slidably mounted, said varying means including means for exerting pressure on the rod to slide the same relative to the support sleeve.

* * * * *